United States Patent [19]
Plomgren et al.

[11] Patent Number: 5,794,770
[45] Date of Patent: Aug. 18, 1998

[54] EASY OPENING CARTON FOR SHIPPING AND STORING CUT PAPER

[75] Inventors: John Frederick Plomgren, Norfolk, Va.; Billy P. Cannon, High Point, N.C.

[73] Assignee: Union Camp Corporation, Lawrenceville, N.J.

[21] Appl. No.: 587,785

[22] Filed: Dec. 26, 1995
(Under 37 CFR 1.47)

Related U.S. Application Data

[63] Continuation-in-part of Ser. No. 216,959, Mar. 24, 1994, abandoned.

[51] Int. Cl.⁶ ............................................................ B65D 5/32
[52] U.S. Cl. .......................... 206/215; 229/3.1; 229/122; 229/123; 229/190
[58] Field of Search ........................ 206/215, 449; 229/3.1, 122, 123, 190, 193, 919, 121

[56] References Cited

U.S. PATENT DOCUMENTS

| | | |
|---|---|---|
| 715,127 | 12/1902 | Norton . |
| 1,216,071 | 2/1917 | Cartensen . |
| 1,271,542 | 7/1918 | Crenshaw . |
| 1,724,636 | 8/1929 | Bell ................................ 229/193 X |
| 1,932,429 | 10/1933 | Wellman ........................ 229/190 X |
| 2,034,885 | 3/1936 | Simon ............................ 229/190 X |
| 2,135,021 | 11/1938 | Zalkind . |
| 2,180,691 | 6/1939 | Olivier . |
| 2,682,362 | 6/1954 | Larson et al. . |
| 2,721,022 | 10/1955 | Billerbeck ...................... 229/122 X |
| 2,797,039 | 10/1957 | Belsinger . |
| 2,797,040 | 6/1957 | Belsinger . |
| 3,015,430 | 1/1962 | Bauer . |
| 3,058,583 | 10/1962 | Williams . |
| 3,143,275 | 8/1964 | Diggs . |
| 3,858,720 | 1/1975 | Flagler . |
| 4,291,806 | 9/1981 | Austin . |
| 4,295,598 | 10/1981 | Calvert . |
| 4,512,477 | 4/1985 | Densen . |
| 4,583,679 | 4/1986 | Johnson ........................ 229/3.1 X |
| 4,753,348 | 6/1988 | Patrick et al. . |
| 4,844,262 | 7/1989 | Patrich et al. ................. 229/122 X |
| 4,858,414 | 8/1989 | Meschi ........................... 206/215 X |
| 4,964,511 | 10/1990 | Meschi . |
| 5,076,491 | 12/1991 | Freudentahl et al. . |
| 5,348,147 | 9/1994 | Gottfreid ........................ 206/215 |

FOREIGN PATENT DOCUMENTS

| | | |
|---|---|---|
| 0057011 | 8/1982 | European Pat. Off. . |
| 0332742 | 9/1989 | European Pat. Off. . |
| 1227491 | 8/1960 | France . |
| 2610898 | 8/1988 | France . |
| 7101236 | 8/1972 | Netherlands . |
| 350943 | 11/1972 | Sweden . |
| 1296040 | 11/1972 | United Kingdom . |
| 1315598 | 5/1973 | United Kingdom . |
| 1592880 | 7/1981 | United Kingdom . |
| 2096052 | 10/1982 | United Kingdom . |
| 2102389 | 2/1983 | United Kingdom . |
| WO89/06209 | 7/1989 | WIPO . |
| WO93/22138 | 11/1993 | WIPO . |
| WO93/25455 | 12/1993 | WIPO . |
| WO95/00399 | 1/1995 | WIPO . |

*Primary Examiner*—Jacob K. Ackun
*Attorney, Agent, or Firm*—Dennis H. Lambert

[57] ABSTRACT

A package especially suited for shipping and storing cut paper and for providing rapid and easy access to the paper when the carton is opened. The package comprises a carton having a lid that may be removed and one side which may be pivoted down when the lid is removed to facilitate access to the contents of the carton for ease of unloading of paper from the carton and ease of reloading. A preferred construction employs a moisture vapor barrier in the walls of the carton to maintain the moisture content of the paper in the carton within acceptable limits when the package is subjected to adverse environmental conditions. In this form of the invention the need for individual ream wraps is eliminated, and the package may be opened and re-closed without detriment to the moisture vapor barrier.

39 Claims, 5 Drawing Sheets

EASY OPENING CARTON FOR SHIPPING AND STORING CUT PAPER

BACKGROUND OF THE INVENTION

This application is a continuation-in-part of application Ser. No. 08/216,959, entitled FLIP SIDE BOX WITH MOISTURE BARRIER, filed Mar. 24, 1994, and now abandoned.

FIELD OF THE INVENTION

This invention relates to packaging, and especially to a package for paper products. More particularly, the invention relates to a box or carton having an openable side in addition to a removable lid, to facilitate access to the contents of the carton for quickly and easily removing or reloading the contents without destroying the integrity of the carton. The invention further relates to such a package having moisture vapor barrier means whereby it may be used for shipping and storing sheets of paper intended for use in equipment which requires that the moisture content of the paper be maintained within predetermined limits for proper performance of the equipment. Such equipment includes but is not limited to photocopiers and printers.

BACKGROUND ART

Cut sheets of paper are typically packaged in cartons designed to closely fit the paper. Such cartons generally have either a removable lid or foldable flaps to close the top of the carton, and the lid is removed or the flaps opened to form an open top through which product is removed from the carton. With such packaging it is difficult to remove the contents without damaging the carton or inverting it to pour the contents out because of the lack of space to insert the hands of the user between the side walls of the carton and the product stored therein. This feature of conventional packaging is particularly bothersome in cartons used for shipping and storing sheets of paper as used, for example, in printers, photocopiers and the like. High speed, high volume copiers, especially, must frequently be filled with paper, and conventional packaging slows the process of removing paper from the carton and loading it into the equipment.

The performance of paper products used in office equipment is especially sensitive to the physical properties of the paper. This is particularly true of paper used in laser printers and photocopiers. The physical properties of paper used in such equipment must be maintained within a relatively narrow range of acceptable limits for proper performance. For use in photocopiers particularly, it is important that the sheets of paper have a proper moisture content and a uniform flat shape without folds, tears or bends. In this regard, the moisture content of photocopy paper should generally be within the range of from about 3.7% to about 5.6%, and preferably about 4.5%, since moisture content outside this range adversely affects the mechano-sorptive property of the paper and may result in non-uniform print quality and/or misfeed of the paper. The physical properties of photocopy paper are especially important in high speed photocopiers, and/or those which perform two-sided copying or collating and the like.

paper produced and packaged at a 4.5% moisture content is only stable at an ambient humidity of about 30%RH in a normal temperature range. If the paper is exposed to a significantly different environment, the paper releases or absorbs atmospheric moisture to establish a state of equilibrium. A change in moisture content induces an appropriate shrinkage or swelling of the sheet. These dimensional changes are usually not uniform or reversible, and result in permanent sheet deformation such as cockled appearance. Cockling and gross changes in the flat size of the sheet can cause missing print or misfeeds and machine jams in high speed photocopiers.

In order to protect the paper from environmental damage, it is typically packaged in cardboard cartons containing several reams of paper sheets. These reams are individually wrapped in a material having a low water vapor transfer rate, such as polyethylene coated wrapping paper, which serves as a moisture vapor barrier to prevent excessive absorption or desorption of moisture in hostile environments. The cardboard carton protects the paper from physical damage such as bent corners and the like.

Traditional packages for paper products such as reprographic paper contain ten individually wrapped reams of paper. Before the paper can be used, these individually wrapped reams of paper must be removed from the package and opened and the wrap discarded. Additionally, the standard ream wrap material comprises polyethylene coated wrapping paper, which is not readily recyclable. Further, ten reams of paper are quite heavy, making it difficult for many people to handle the packages.

There is thus need for a carton for shipping and storing sheets of paper, such as photocopy paper or the like, which not only protects the paper against physical damage from the environment, but which also enables the sheets of paper to be easily and quickly unloaded from the carton. The carton should prevent excessive absorption or desorption of moisture in the paper, even when it is stored in an environment having either very high or very low humidity, and should be lightweight and easy to handle, and preferably recyclable.

SUMMARY OF THE INVENTION

The present invention comprises a carton constructed for shipping and storing paper in a way to permit easy access to the paper for unloading it from the carton. The carton of the invention is particularly suited for shipping and storing sheets of paper for use in printers, photocopiers and the like. Even more specifically, the carton is particularly adapted to ship and store unwrapped sheets of paper, although it may equally as well be used for shipping and storing individually wrapped reams of paper.

The carton includes at least one side wall which may be pivoted downwardly to open the carton and expose the contents for easy removal. A lid is telescopically engaged over the open top of the carton to close the top of the carton and normally hold the pivoted side wall in closed position. When the lid is removed, that side wall may be pivoted downwardly, exposing the paper at the top and one side to facilitate access to it.

The openable side panel enables the user to easily and quickly grasp and unload the paper stored in the carton, without the necessity of forcing the hands or fingers between the carton side walls and the contents, or turning the carton over and dumping out the contents. Moreover, the openable side wall may be reclosed, thereby restoring the package to its unopened condition.

Further, in accordance with one form of the invention, a moisture vapor barrier is provided in the carton itself, permitting the paper to be placed in the carton in loose sheets, without the necessity of wrapping individual reams in a protective cover, as done in conventional packaging. With the invention, the user may simply grasp and unload as many sheets as desired, without the need to open individual reams. This is especially helpful when high speed, high volume copiers are being restocked with copy paper. Studies have shown that it takes approximately 31% less time to load paper into the desired equipment using the carton of the invention as compared with traditional packaging.

The moisture vapor barrier preferably comprises a coating of material that is recyclable, and which provides an effective gas or vapor barrier. For example, a suitable coating could comprise a film-forming emulsified material that forms a close-grained crystal structure which is hydrophobic upon curing. A repulpable coating with water vapor barrier properties may also be formed from available dispersions such as acrylates and the like. Further, the moisture vapor barrier may comprise a layer of polyethylene extruded onto or otherwise applied to paper. A specific construction comprises a lamination of low density polyethylene (LDPE) and Kraft paper applied as the inner or outer lining of the carton. Although polyethylene forms an effective moisture barrier, it is not readily recyclable.

The main parameters sought for the moisture vapor barrier material are a moisture vapor transfer rate of about two or less grams per one hundred square inches, over a twenty four hour period and under ambient conditions of one hundred degrees Fahrenheit and ninety percent relative humidity. Further, the coating material preferably has a coating weight on the liner of from about 1.2 to 1.7 pounds per one thousand square feet.

A variety of coating materials and structures were tried by applicant, including water repellant coatings applied to the outer liner before carton converting, but this failed to provide a barrier to water vapor. Such coatings therefore appear to be more suitable where liquids are encountered, and have little effectiveness in preventing transfer of water vapor. Additionally, a test sample was constructed using linerboard coated with a resin emulsion, but this provided no moisture vapor barrier.

A carton coated with LDpE in accordance with the invention provides essentially the same protection to unwrapped sheets of paper stacked in the carton as individually wrapped reams, with sheets at the top of the stack and sheet edges not having a significantly different moisture content than the sheets at the center of the stack. Sheets of paper stacked loose in untreated or unprotected cartons, on the other hand, showed high spatial moisture differences (as much as 50% after 24 hours) between the center of the stack, the top of the stack and along the edges.

An insert panel of corrugated cardboard or chipboard, or other suitable material, could be placed in the top of the carton between the lid and the top sheets of paper to absorb excess moisture and help in maintaining the proper moisture content in the top sheets of paper. This insert also helps to protect against physical damage to the paper. A similar insert could be placed in the bottom of the carton, if desired.

The carton of the invention may be opened to gain access to the paper stacked inside, and reclosed without destroying the integrity of the carton structure, including the moisture barrier. It may therefore be reused for refilling, shipping, filing and storage.

The carton of the invention is also preferably dimensioned to hold three to five reams (1500–2500 sheets) of paper, as opposed to the more traditional ten reams, and is therefore much lighter and easier to handle, weighing only about 25 pounds in the five ream configuration as compared to about 50 pounds for traditional ten ream packages. It could, of course, be dimensioned to hold a greater or lesser amount of paper without departing from the invention.

A preferred construction of the carton for use with automated loading or filling equipment includes relatively short or narrow flaps on the openable panel, and wider flaps on the fixed panel. The shorter flaps on the openable panel prevent sheets of paper from being pulled from the carton when the openable panel is pivoted downwardly to open the carton. The flaps on the two panels abut one another when the openable panel is closed, improving the strength and stability of the carton and enhancing the moisture vapor barrier when the barrier is incorporated in the carton itself. That portion of the flaps on the openable panel which first enter between the carton end panels and the paper remaining in the carton after it has been opened are rounded to facilitate reentry of the flaps back into the carton between the end walls and the paper when the openable panel is being closed.

In another form of the invention the end flaps on the pivoted panel are the same width as the flaps on the fixed panel, and the flaps meet or abut one another at approximately the midpoint of the end walls of the carton.

A specific package constructed in accordance with the invention has overall inside dimensions of about 8½×11×9⅞ inches and holds approximately 2500 sheets of 8½×11 paper. The carton is constructed of corrugated cardboard having an outer liner of 38# Kraft paper, a medium of 26# fluting, and an inner liner comprising a laminate of two 17# sheets of Kraft paper with a moisture vapor barrier layer between them. The moisture vapor barrier may comprise a sheet of LDPE, or other material suitable for the intended purpose, and may be sprayed, rolled, printed or otherwise applied onto one of the sheets of Kraft paper or applied as a separate sheet adhesively secured between the sheets of Kraft paper. The moisture barrier may have any suitable thickness, ranging from about ½ mil thick for less severe ambient conditions upwardly to any desired or necessary thickness.

A 0.001 inch thick sheet of LDPE, for example, performs satisfactorily even in hostile environments.

One or more plastic straps are placed around the carton to secure the lid in place during shipment and storage. The strap or straps are removed to enable the lid to be opened to gain access to the paper inside the carton, and thereafter the lid may be easily replaced and removed during use. In a preferred embodiment the strap or straps are made wider than conventional straps in order to minimize or eliminate potential damage to the carton and/or paper contained therein when the strap or straps are used to carry the carton. A suitable width, for example, is about 12 mm.

In some applications the carton may be shrink-wrapped to provide the necessary moisture protection. In this configuration the fold-down panel and other structural features of the carton would still provide the advantages related to ease of use, as discussed above, but the carton itself would not incorporate a moisture vapor barrier material in its construction.

BRIEF DESCRIPTION OF THE DRAWINGS

The foregoing as well as other objects and advantages of the invention will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
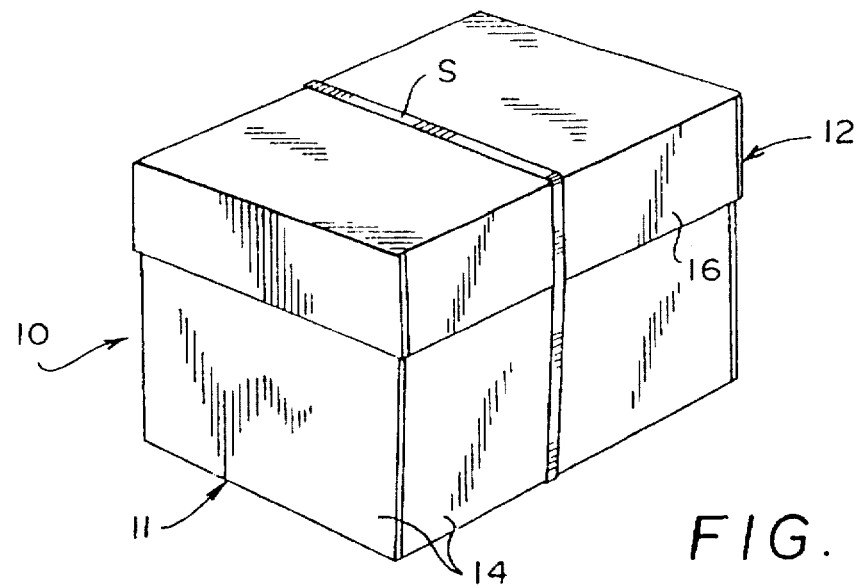
FIG. 1 is a top perspective view of a preferred package constructed in accordance with the invention.
Figure 2:
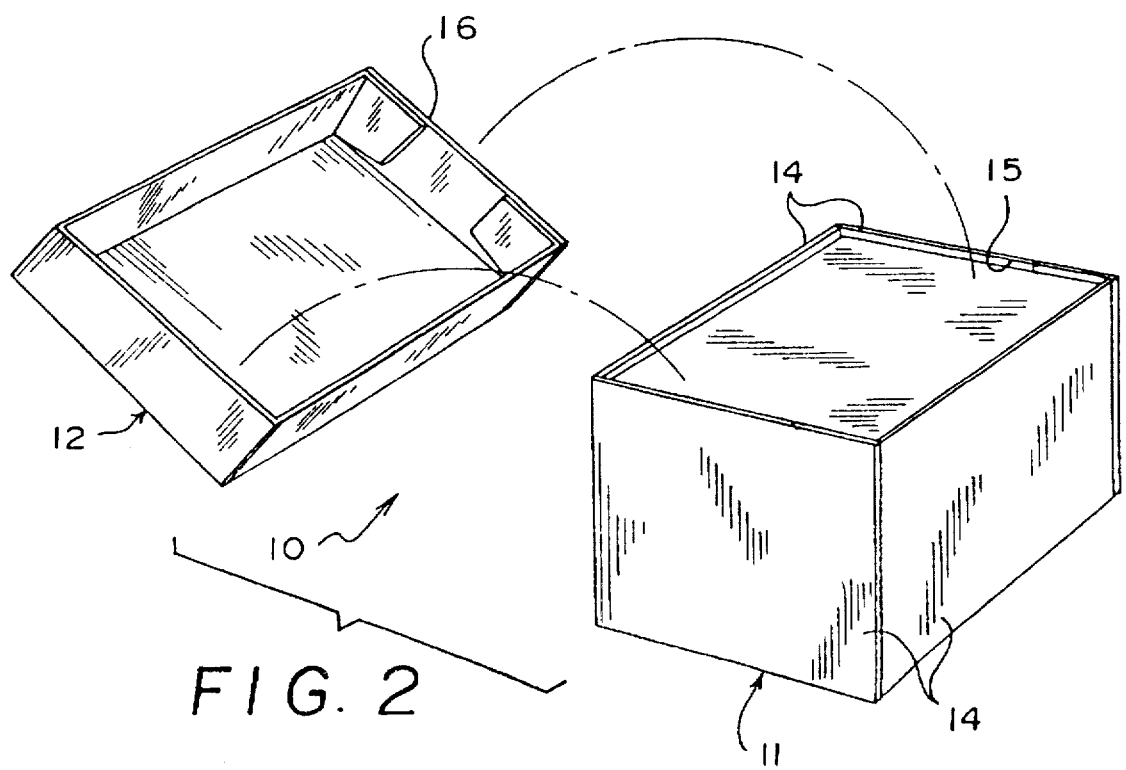
FIG. 2 is an exploded top perspective view of the package of FIG. 1, showing the lid removed.

Referring more particularly to the drawings, a preferred package in accordance with the invention is indicated generally at 10 in FIGS. 1–7. In this form of the invention the package comprises a rectangularly shaped box or carton 11 with a bottom 13, opposite side walls 14 and an open top 15. A lid 12 is telescopically received over the open top and has a depending skirt 16 which extends downwardly a short distance in encircling relationship over the side walls of the carton. A strap S of plastic or other suitable material is placed around the carton and over the lid to secure the lid in place during storage and shipment. This strap is removed when it is desired to gain access to the contents of the carton, and the lid may thereafter be easily removed and replaced. Although only one strap is shown, it should be understood that more than one strap may be employed, if desired. Further, the strap or straps may have a width greater than the width of straps normally used to minimize or prevent damage to the carton and/or paper contained therein when the strap or straps are used to carry the package.

Figure 4:
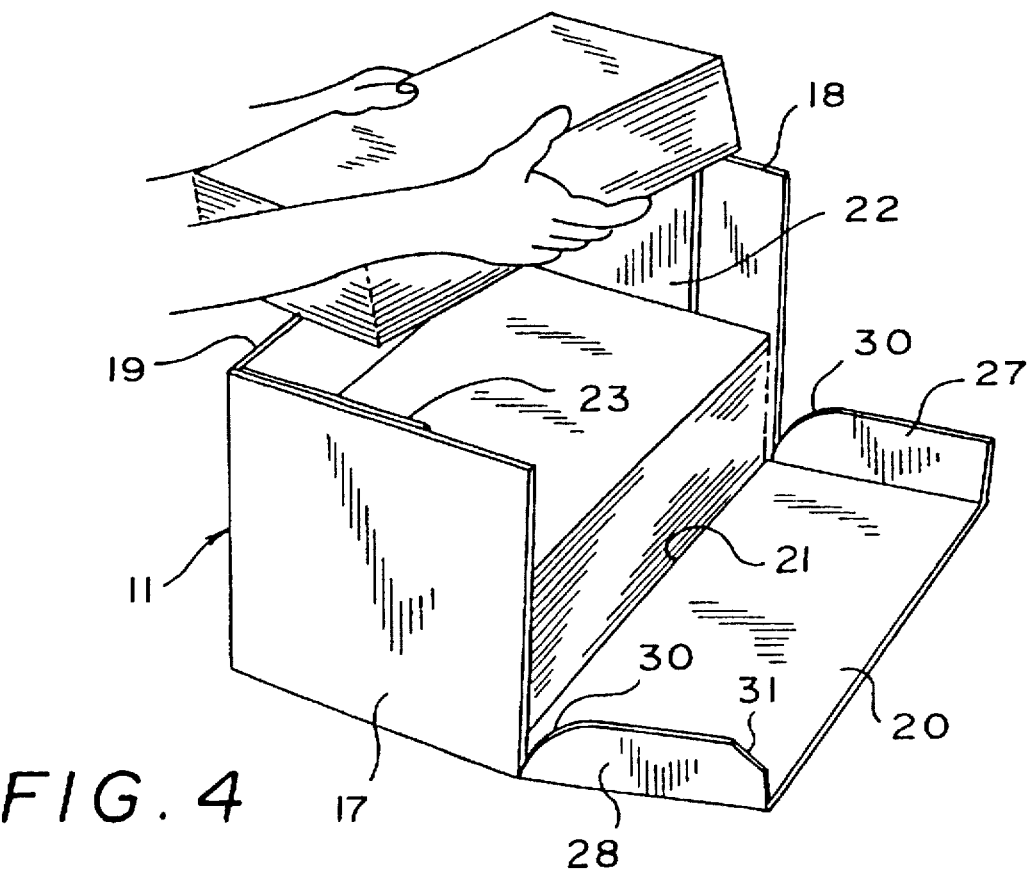
FIG. 4 is a top perspective view of the package of FIG. 3 with the movable panel fully opened and depicting the removal of several sheets from the stack inside the carton.
Figure 5:
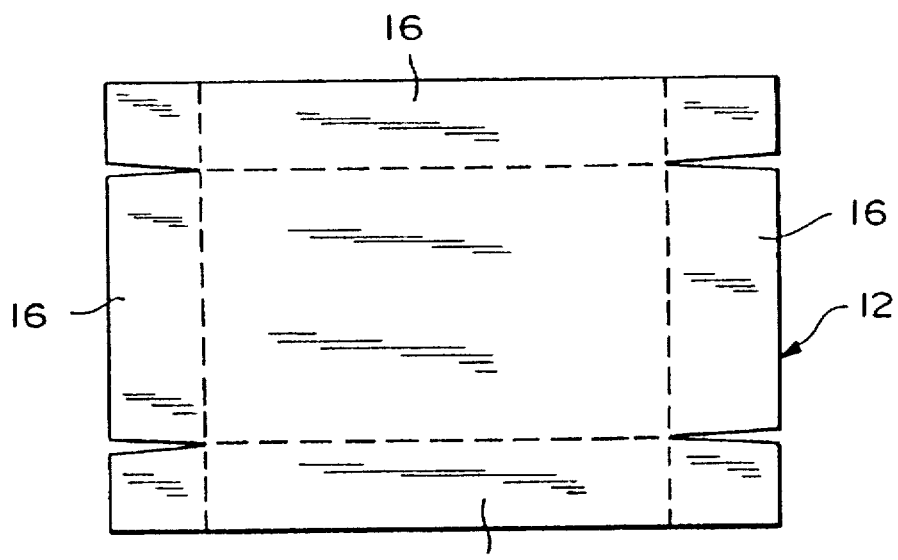
FIG. 5 is a plan view of the blank from which the lid is formed.
Figure 6:
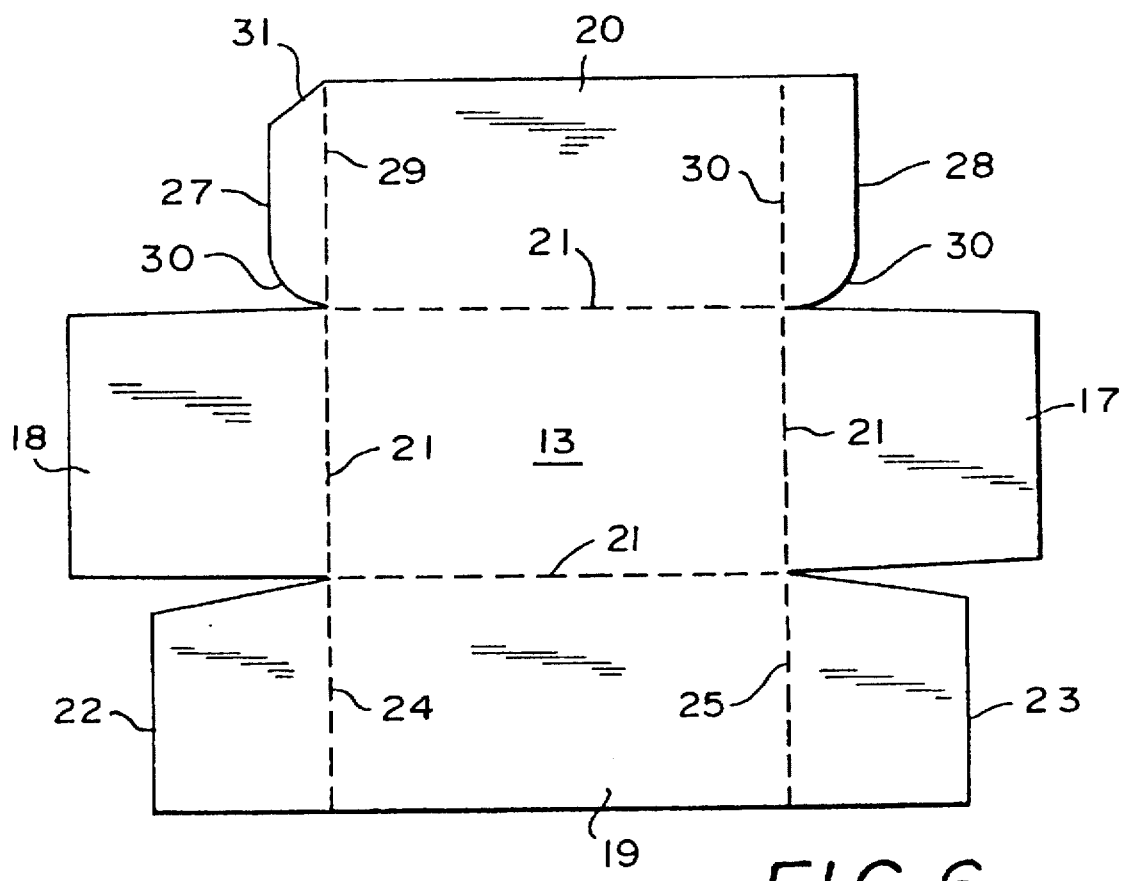
FIG. 6 is a plan view of the blank from which the carton is formed.

As seen best in FIGS. 4 and 6, the side walls include two end panels 17 and 18 and two side panels 19 and 20, each integrally joined to a respective edge of the bottom wall 13 along fold lines 21. A first side panel 19 has end flaps 22 and 23 joined to the ends of the panel along fold lines 24 and 25, and a second side panel 20 has end flaps 27 and 28 joined to opposite ends of the panel along fold lines 29 and 30. The end flaps 27 and 28 on panel 20 are considerably shorter or narrower than the end flaps 22 and 23 on the opposite side panel 19. The end flaps on the two side panels are dimensioned so that they abut one another when they are folded inwardly toward one another and the respective side panels are folded upwardly into operative position.

The two end panels 17 and 18 are then folded upwardly about their respective fold lines 21 into overlying relationship with the end flaps on the side panels, and adhesively secured to the end flaps 22 and 23 on the side panel 19.

Figure 3:
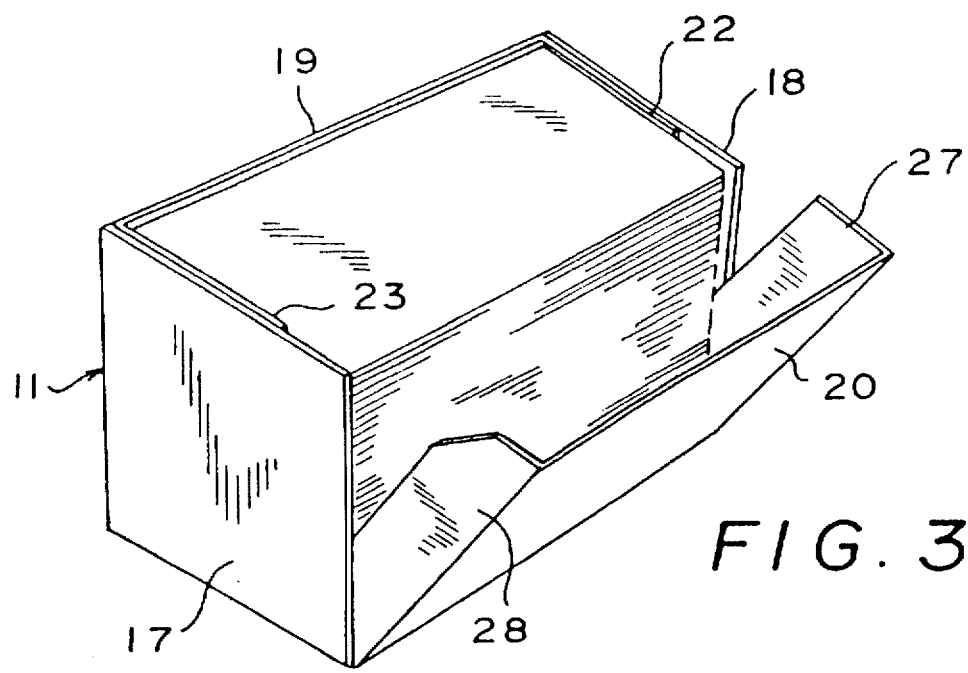
FIG. 3 is a top perspective view of the package of FIG. 2, as used for containing a stack of loose sheets of paper, with the movable side panel pivoted to a partially open position.

However, the end flaps 27 and 28 on side panel 20 are left unsecured so that panel 20 may be folded downwardly about its fold line 21 as shown in FIGS. 3 and 4. Thus, after the lid 12 is removed the panel 20 may be pivoted downwardly about the hinge defined at its juncture with the bottom wall 13, thereby opening the carton and exposing the contents for easy access and removal.

To facilitate reentry of the end flaps 27 and 28 back into position between the respective end panels 17 and 18 and the contents of the carton after the carton has been opened, the corners of the flaps which first enter the carton are rounded at 30. A notch 31 or other indicator may be provided on one of the panels of the carton for detection by a signalling means to obtain predetermined operation of automated equipment used in constructing the package of the invention.

The carton construction thus described greatly facilitates access to and removal of sheets of paper from the carton, whether the paper is wrapped in individual reams or placed loose in the carton.

Figure 7:
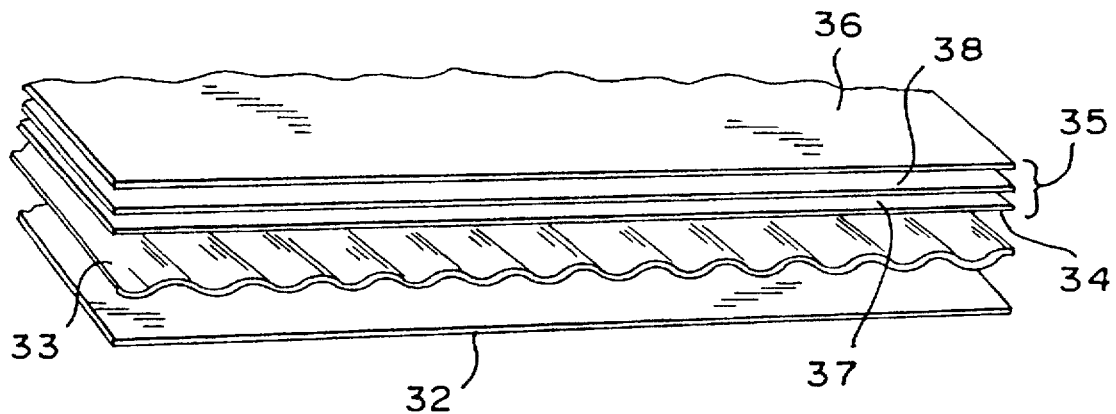
FIG. 7 is a fragmentary, exploded, enlarged perspective view showing the different layers comprising the walls of the carton of the invention in one of its forms.

Referring to FIG. 7, one example of a specific construction of the carton includes an outer liner 32 adhesively secured to one surface of a medium 33 of corrugated material, and an inner liner 34 adhesively secured to the opposite surface of the corrugated medium. In that form of the invention which incorporates the moisture vapor barrier in the carton itself, the inner liner comprises a laminate 35 formed of two sheets of material 36 and 37 with a moisture vapor barrier layer 38 sandwiched therebetween.

In a more specific construction, the outer liner 32 comprises a sheet of 38# Kraft paper, the corrugated medium 33 comprises 26# fluting, and the inner liner laminate 35 comprises two sheets 36 and 37 of 17# Kraft paper with a sheet 38 of low density polyethylene (LDPE) sandwiched between them.

The foregoing structure provides a package that is much easier to use than conventional packaging, and when the carton incorporates a moisture vapor barrier in the walls it may be used to ship and store unwrapped, loose sheets of paper to facilitate access to the paper while at the same time protecting the paper from adverse absorption or desorption of moisture essentially as well as conventional packaging which uses individually wrapped reams of paper. As previously discussed, the carton of the invention may equally as well be used to store and ship individually wrapped reams of paper, in which case the moisture vapor barrier material may be omitted from the carton itself.

Figure 8:
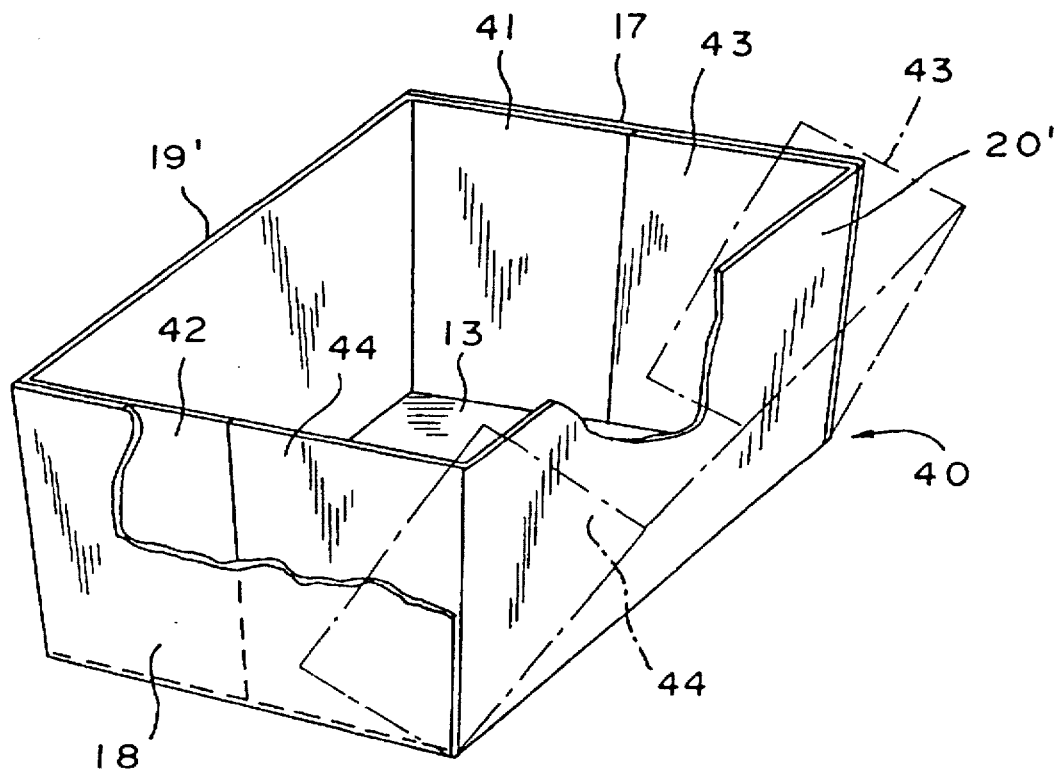
FIG. 8 is a somewhat schematic, top perspective view of a second form of carton of the invention, with the lid removed and portions broken away for purpose of clarity, showing essentially equal sized end flaps on the side panels of the carton, and illustrating how these flaps extend inwardly toward one another to meet at approximately the midpoint of the ends of the carton, and showing in dot and-dash lines how one of the side panels is pivoted downwardly to open the side of the carton.

A modification of the invention is indicated at 40 in FIG. 8, and is identical to that form of the invention previously described except that the end flaps 41, 42, 43 and 44 on the opposite side panels 19' and 20' are all the same size, whereby they extend to the midpoint of the end panels when the carton is fully assembled and closed as shown in full lines in this figure. The openable side panel 20' may be pivoted downwardly to open the carton when the lid is removed, as indicated in dot-and-dash lines in this figure.

Figure 9:
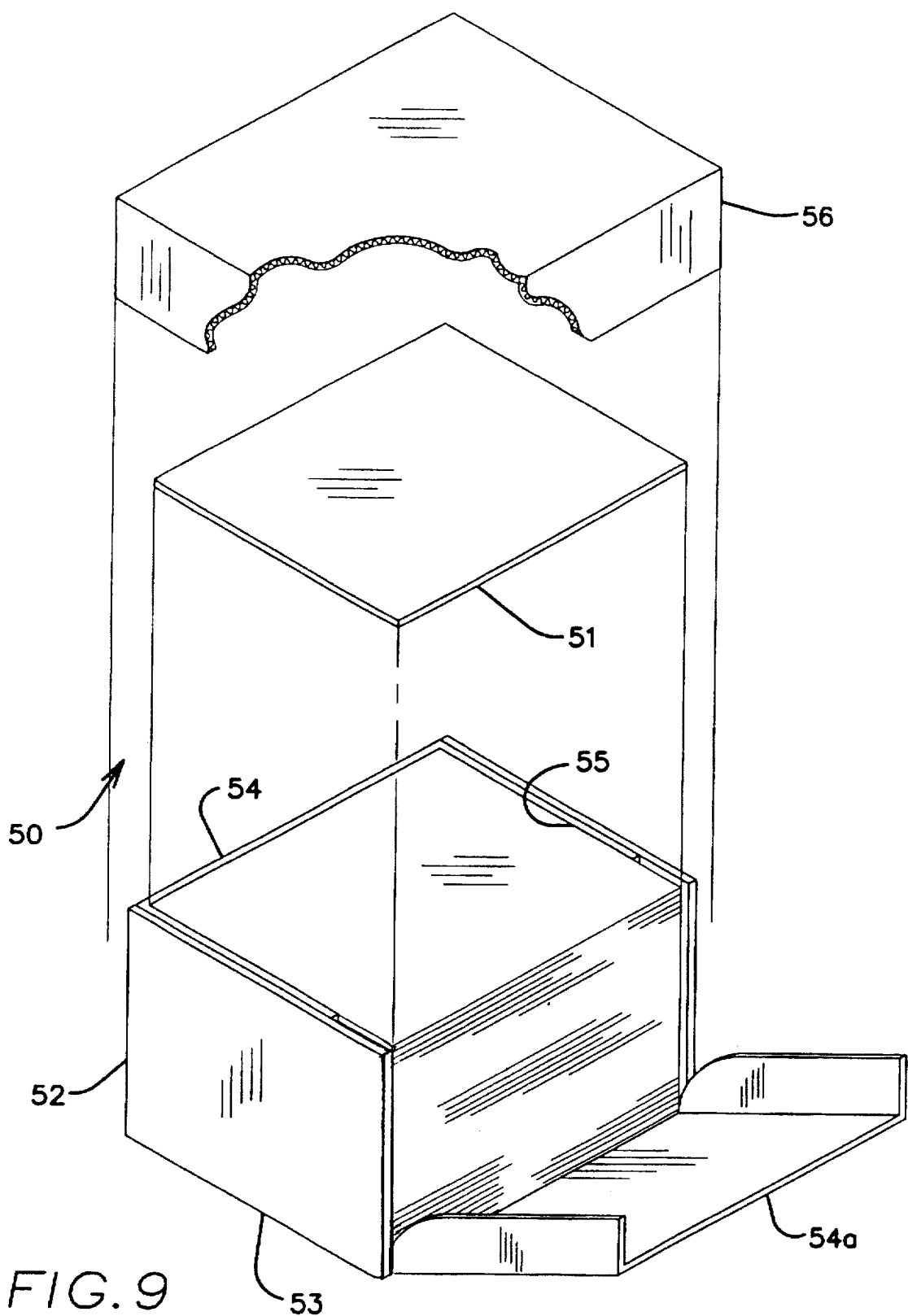
FIG. 9 is an exploded top perspective view of another form of the invention with parts broken away for purpose of clarity, wherein an insert panel is placed in the top of the package.

A further modification of the invention is indicated generally at 50 in FIG. 9, wherein an insert panel 51 is placed in the carton 52. The carton has a bottom wall 53, opposite side walls 54, an open top 55 and a lid 56 for closing the open top. One of the side walls 54a is pivotable about its bottom edge, just as in the previously described forms of the invention, to enable the paper in the carton to be exposed at the top and one side when the lid is removed and the pivotable side wall moved to its open position. The insert panel 51 may be made of corrugated cardboard or chipboard, or other suitable material, and serves to absorb excess moisture at the top of the carton to maintain the proper moisture content in the top sheets. It also provides additional protection against physical damage to the top sheets of paper. If desired, a bottom insert panel (not shown) may also be placed in the bottom of the carton.

While particular embodiments of the invention have been illustrated and described in detail herein, it should be understood that various changes and modifications may be made to the invention without departing from the spirit and intent of the invention as defined by the scope of the appended claims.

What is claimed is:

1. A package for shipping and storing a quantity of cut sheets of paper for use in equipment which requires that the moisture content of the paper be within predetermined limits for proper performance of the. equipment, comprising:

a carton containing a quantity of sheets of cut paper, said carton having a bottom wall, a plurality of upstanding side walls each joined along a bottom edge to a respective edge of the bottom wall, an open top, and a removable lid telescopically engaged over the open top;

one of said side walls being unsecured to adjoining side walls and being pivotable about its bottom edge downwardly and away from the carton to an open position when the lid is removed, thereby exposing the cut paper at the top and one side to permit easy access to paper contained in the carton for rapid unloading of the paper from the carton;

said one side wall having inturned flaps on opposite side edges thereof which extend into the carton in contiguous, parallel, overlapping relationship with adjacent side walls when said one side wall is in closed position; and moisture vapor barrier means associated with the carton for maintaining the moisture content of the cut sheets of paper within predetermined limits under adverse ambient conditions.

2. A carton as claimed in claim 1, wherein:

said side walls, bottom wall and lid are imperforate and said moisture vapor barrier means is in said side walls, bottom wall and lid, whereby the need for wrapping individual reams of cut paper in moisture-vapor-barrier ream wrap is eliminated and the moisture barrier means is maintained when the carton is opened and re-closed.

3. A package as claimed in claim 2, wherein:

said side walls are integrally joined to the bottom wall, and all except said one side wall are secured and sealed to one another at adjacent side edges.

4. A package as claimed in claim 3, wherein:

said carton is rectangular in shape, and said side walls comprise a pair of opposed side panels at opposite sides of the carton and a pair of opposed end panels at opposite ends of the carton, one of said side panels comprising the pivotable side wall; and each of the side panels has a pair of inturned flaps along its opposite side edges which extend into the carton in contiguous, parallel, overlapping relationship with the adjacent inturned flaps when the carton is closed, said end panels extending over essentially the entire extent of the ends of the carton.

5. A package as claimed in claim 4, wherein:

said inturned flaps on the opposed side panels extend into edge-to-edge abutting relationship with one another when the carton is closed.

6. A package as claimed in claim 5, wherein:

the inturned flaps on said pivotable panel are relatively narrow so that they may be moved into and out of the carton without unduly disturbing the contents of the carton.

7. A package as claimed in claim 5, wherein:

the inturned flaps on said opposite side panels are equal in width and they meet in edge-to-edge abutting relationship at approximately the midpoint of the opposite end panels.

8. A package as claimed in claim 1, wherein:

the carton and lid are made of corrugated cardboard having an outer liner, an inner liner and a fluted medium.

9. A package as claimed in claim 2, wherein:

the moisture vapor barrier comprises a layer of material with a low water vapor transfer rate to protect the sheets of paper therein from ambient moisture conditions and thereby maintain the moisture content of the sheets of paper within a predetermined range.

10. A package as claimed in claim 9, wherein: the moisture vapor barrier material comprises a sheet of polyethylene.

11. A package as claimed in claim 10, wherein: the sheet of polyethylene comprises low density polyethylene.

12. A package as claimed in claim 9, wherein:

the bottom wall, side walls and lid are made of corrugated cardboard having an outer liner, an inner liner and a fluted medium; and the layer of moisture vapor barrier material is on the inner liner.

13. A package as claimed in claim 12, wherein:

the inner liner is a laminate comprising two sheets of Kraft paper with a polyethylene sheet sandwiched therebetween.

14. A package as claimed in claim 13, wherein:

said side walls are integrally joined to the bottom wall, and all except said one side wall are secured and sealed to one another at adjacent side edges.

15. A package as claimed in claim 14, wherein:

said carton is rectangular in shape, and said side walls comprise a pair of opposed side panels at opposite sides of the carton and a pair of opposed end panels at opposite ends of the carton, one of said side panels comprising the pivotable side wall; and each of the side panels has a pair of inturned flaps along its opposite side edges which extend into the carton in contiguous, parallel, overlapping relationship with the adjacent end panels when the carton is closed, said end panels extending over essentially the entire extent of the ends of the carton.

16. A package as claimed in claim 15, wherein:

said inturned flaps on the opposed side panels extend into edge-to-edge abutting relationship with one another when the carton is closed.

17. A package as claimed in claim 16, wherein:

the inturned flaps on said pivotable panel are relatively narrow so that they may be moved into and out of the carton without unduly disturbing the contents of the carton.

18. A package as claimed in claim 16, wherein:

the inturned flaps on said opposite side panels are equal in width so that they meet in edge-to-edge abutting relationship at approximately the midpoint of the opposite end panels.

19. A package as claimed in claim 2, wherein:

one of said panels has indicia thereon which can be detected by signalling means on automated packaging equipment used in making the package.

20. A package for shipping and storing a quantity of cut paper sheets for use in photocopiers, printers and other equipment which requires a supply of sheets of cut paper, comprising:

a carton containing a quantity of sheets of cut paper, said carton having a bottom wall, a plurality of upstanding side walls each joined along the bottom edge to a respective edge of the bottom wall, an open top, and removable lid telescopically engaged over the open top;

one of said side walls being unsecured to adjoining side walls and being pivotable about its bottom edge downwardly and away from the carton to an open position when the lid is removed to expose paper contained in the carton at the top and one side to permit easy access to the paper for rapid unloading of the paper from the carton; and said one side wall having inturned flaps on opposite side edges thereof which extend into the carton in contiguous, parallel, overlapping relationship with adjacent side walls when said one side wall is in closed position, said adjacent side walls having means defining spaces providing clearance from adjacent edges of paper contained in the carton, and said inturned flaps being received in these spaces when said one side wall is in its closed position.

21. A package as claimed in claim 20, wherein:

moisture vapor barrier means is provided in the package for maintaining the moisture content of the cut sheets of paper within predetermined limits under adverse ambient conditions.

22. A package as claimed in claim 21, wherein:

the moisture vapor barrier means is incorporated in the bottom wall, side walls and lid of the carton, thereby eliminating the necessity of ream-wrapping individual reams of paper in the carton and enabling the moisture vapor barrier means to be maintained after the package has been opened and re-closed.

23. A package for shipping and storing sheets of paper for use in equipment which requires that the moisture content of the paper be within predetermined limits for proper performance of the equipment, comprising:

a carton containing a quantity of sheets of paper, said carton having a bottom wall, upstanding side walls, an open top and a lid closing the open top; and said bottom, side walls and lid having moisture vapor barrier means to maintain the moisture content of sheets of paper contained therein within predetermined limits when the carton is exposed to ambient conditions having either very high or very low humidity, thereby eliminating the necessity of wrapping individual reams of paper in moisture vapor barrier material.

24. A package as claimed in claim 23, wherein:

the carton is made of a paper material and the moisture vapor barrier means comprises a layer of material having a low water vapor transfer rate applied to the bottom wall, side walls and lid.

25. A package as claimed in claim 24, wherein:

the carton is made of corrugated cardboard having an inner liner, a fluted medium and an outer liner; and the moisture vapor barrier layer is formed on the inner liner.

26. A package as claimed in claim 25, wherein:

the inner liner comprises a laminate of two sheets of Kraft paper with a sheet of polyethylene sandwiched therebetween, the sheet of polyethylene forming the moisture vapor barrier layer.

27. A package as claimed in claim 23, wherein:

the moisture vapor barrier means comprises a film-forming emulsified coating with a close-grained crystal structure that is hydrophobic upon being cured.

28. A package as claimed in claim 23, wherein: the moisture vapor barrier means comprises an acrylate dispersion.

29. A package as claimed in claim 23, wherein: the moisture vapor barrier means comprises a polyethylene film.

30. A package as claimed in claim 23, wherein:

the moisture vapor barrier means comprises a laminate of two sheets of Kraft paper with a polyethylene sheet sandwiched therebetween.

31. A carton for shipping and storing sheets of paper for use in equipment which requires that the moisture content of the paper be within predetermined limits for proper performance of the equipment, wherein:

said carton contains a quantity of sheets of paper, and has an imperforate bottom wall, a plurality of upstanding imperforate side walls each joined along a bottom edge to a respective edge of the bottom wall, an open top, and a removable imperforate lid telescopically engaged over the open top, all but one of said side walls being joined together at adjacent side edges thereof;

said one side wall being unsecured to adjoining side walls and being pivotable about its bottom edge downwardly and away from the carton to an open position when the lid is removed, opening one side of the carton to expose at the top and one side the paper contained in the carton, said one side wall being held in its closed position when the lid is in place on the open top; and said one side wall and an opposed side wall each having inturned flaps on opposite side edges thereof which extend into the carton in contiguous, parallel, overlapping relationship with adjacent side walls, and the flaps on the opposed side walls extend into abutting, edge-to-edge relationship with one another when said one side wall is in closed position, whereby when the lid is in place on the open top and said one side wall is in closed position, the carton encloses the sheets of paper and protects them from the environment, and when the lid is removed from the open top and said one side wall is pivoted to its open position the sheets of paper are exposed at the top and one side for easy access and may be quickly and easily grasped and removed from the carton for use.

32. A carton as claimed in claim 31, wherein:

said carton is rectangular in shape, and said side walls comprise a pair of opposed side panels at opposite sides of the carton and a pair of opposed end panels at opposite ends of the carton, one of said side panels comprising the pivotable side wall; and each of the side panels has a pair of inturned flaps along its opposite side edges which extend into the carton in contiguous, parallel, overlapping relationship with the adjacent end panels when the carton is closed, said flaps extending over essentially the entire extent of the respective side edges.

33. A carton as claimed in claim 32, wherein:

the inturned flaps on said pivotable panel are relatively narrow so that they may be moved into and out of the carton without unduly disturbing the contents of the carton.

34. A carton as claimed in claim 32, wherein:

an insert panel is placed in the top of the carton immediately beneath the lid to absorb excess moisture and provide protection against physical damage to paper contained in the carton.

35. A carton as claimed in claim 31, wherein:

the bottom wall, side walls, and lid are treated with a material which forms a moisture vapor barrier to maintain within predetermined limits the moisture content of paper in the carton.

36. A package comprising a carton containing a quantity of cut paper for use in equipment which requires that the moisture content of the paper be within predetermined limits for proper performance of the equipment, wherein:

said carton has a bottom wall, a plurality of upstanding side walls each joined along a bottom edge to a respective edge of the bottom wall, an open top, and a removable lid telescopically engaged over the open top, all but one of said side walls being joined together at adjacent side edges thereof;

said one side wall being unsecured to adjoining side walls and being pivotable about its bottom edge downwardly and away from the carton to an open position when the lid is removed, opening one side of the carton to expose the paper at the top and one side, said one side wall being held in its closed position when the lid is in place on the open top; and said one side wall and an opposite side wall having inturned flaps extending completely along opposite side edges thereof and which extend into the carton in contiguous, parallel, overlapping relationship with adjacent side walls when said one side wall is in closed position, said flaps being configured with said adjacent side walls to enable opening of said one side wall and withdrawal of said flags without disturbing the sheets of paper in the carton, said carton completely enclosing the sheets of paper and protecting them from the environment when the lid is in place on the open top and said one side wall is in closed position, and when the lid is removed from the open top and said one side wall is pivoted to its open position the paper is exposed at the top and one side for easy access and may be quickly and easily grasped and removed from the carton for use.

37. A package as claimed in claim 36, wherein:

said carton is rectangular in shape, and said side walls comprise a pair of opposed side panels at opposite sides of the carton and a pair of opposed end panels at opposite ends of the carton, one of said side panels comprising the pivotable side wall; and each of the side panels has a pair of inturned flaps along its opposite side edges which extend into the carton in contiguous, parallel, overlapping relationship with the adjacent end panels when the carton is closed, said end panels extending over essentially the entire extent of the ends of the carton.

38. A package as claimed in claim 37, wherein:

said inturned flaps on the opposed side panels extend into edge-to-edge abutting relationship with one another when the carton is closed.

39. A package as claimed in claim 38, wherein:

the inturned flaps on said pivotable panel are relatively narrow so that they may be moved into and out of the carton without unduly disturbing the contents of the carton.

* * * * *